US011856273B2

(12) United States Patent
Percival (10) Patent No.: US 11,856,273 B2
(45) Date of Patent: Dec. 26, 2023

(54) METHOD AND SYSTEM FOR DIGITAL PROGRAM INSERTION IN SATELLITE COMMUNICATIONS

(71) Applicant: DISH Network L.L.C., Englewood, CO (US)

(72) Inventor: Robert Percival, Carr, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/723,478

(22) Filed: Dec. 20, 2019

(65) Prior Publication Data
US 2021/0195298 A1   Jun. 24, 2021

(51) Int. Cl.
| | |
|---|---|
| *H04N 21/234* | (2011.01) |
| *H04N 21/44* | (2011.01) |
| *H04N 21/61* | (2011.01) |
| *H04N 21/439* | (2011.01) |
| *H04N 21/233* | (2011.01) |
| *H04N 21/434* | (2011.01) |
| *H04N 21/81* | (2011.01) |
| *H04N 21/854* | (2011.01) |
| *H04N 21/845* | (2011.01) |

(52) U.S. Cl.
CPC ......... *H04N 21/812* (2013.01); *H04N 21/233* (2013.01); *H04N 21/23424* (2013.01); *H04N 21/434* (2013.01); *H04N 21/439* (2013.01); *H04N 21/44016* (2013.01); *H04N 21/6143* (2013.01); *H04N 21/6193* (2013.01); *H04N 21/8456* (2013.01); *H04N 21/854* (2013.01)

(58) Field of Classification Search
CPC .......... H04N 21/233; H04N 21/23424; H04N 21/434; H04N 21/439; H04N 21/44016; H04N 21/6143; H04N 21/6193; H04N 21/8456; H04N 21/854; H04N 21/812
USPC .......................................................... 725/32
See application file for complete search history.

(56) References Cited

U.S. PATENT DOCUMENTS

| | | | |
|---|---|---|---|
| 8,763,029 B1 * | 6/2014 | Haberman | H04N 21/812 725/32 |
| 2004/0189873 A1 * | 9/2004 | Konig | G06K 9/00758 348/607 |

(Continued)

FOREIGN PATENT DOCUMENTS

WO    WO-2011001207 A1 *   1/2011   ........... H04N 21/458

OTHER PUBLICATIONS

Digital Program Insertion Cueing Message for Cable, Society of Cable Telecommunications Engineers, Engineering Committee, Digital Video Subcommittee, American National Standard ANSI/SCTE 35, 37 pages (2004) (Year: 2004).*

(Continued)

*Primary Examiner* — Alfonso Castro
(74) *Attorney, Agent, or Firm* — Jeremiah J. Baunach; VLP Law Group LLP (57) ABSTRACT

A satellite provider system receives a provider stream including break cue data. The satellite provider system generates adjusted break cue data by adjusting time stamps in the break cue data. The satellite provider system inserts the break cue data, the adjusted break cue data, and break description data into the provider stream in data packets all having a same packet identification. The satellite provider system broadcasts the provider stream from a satellite transponder.

8 Claims, 6 Drawing Sheets

(56) References Cited

U.S. PATENT DOCUMENTS

| | | | |
|---|---|---|---|
| 2009/0217318 A1* | 8/2009 | VerSteeg | G06Q 30/02 |
| | | | 725/32 |
| 2011/0270653 A1* | 11/2011 | Gupta | H04N 21/812 |
| | | | 705/14.4 |
| 2014/0020013 A1* | 1/2014 | DiLorenzo | G06Q 30/0251 |
| | | | 725/32 |
| 2020/0204279 A1* | 6/2020 | Lykes | H04N 21/812 |

OTHER PUBLICATIONS

"Digital Program Insertion Cueing Message for Cable," Society of Cable Telecommunications Engineers, Engineering Committee, Digital Video Subcommittee, American National Standard ANSI/SCTE 35, 37 pages (2004) (hereafter SCTE Standards). (Year: 2004).*

* cited by examiner

502
RECEIVE A PROVIDER STREAM INCLUDING BREAK CUE DATA PACKETS HAVING TIME STAMPS CORRESPONDING TO BREAKS IN A MEDIA PROGRAM IN THE PROVIDER STREAM

504
GENERATE ADJUSTED BREAK CUE DATA PACKETS BY ADJUSTING TIME STAMPS OF THE BREAK CUE DATA PACKETS

506
MERGE THE BREAK CUE DATA PACKETS AND THE ADJUSTED BREAK CUE DATA PACKETS INTO A DATA STREAM

508
GENERATE AN ADJUSTED PROVIDER STREAM BY INSERTING THE DATA STREAM INTO THE PROVIDER STREAM

510
TRANSMIT THE ADJUSTED PROVIDER STREAM FROM A SATELLITE TRANSPONDER

METHOD AND SYSTEM FOR DIGITAL PROGRAM INSERTION IN SATELLITE COMMUNICATIONS

BACKGROUND

Technical Field

The present disclosure relates to the field of satellite communication systems. The present disclosure relates more particularly to digital program insertion (DPI) in satellite communication systems.

BRIEF SUMMARY

In one embodiment, a satellite television provider system includes a DPI processor. The DPI processor includes a filter configured to receive metadata of a provider stream of a media provider. The metadata includes break cue data packets having time stamps corresponding to breaks in a program in the provider stream. The filter is configured to output the break cue data packets. The DPI processor includes a cue adjuster configured to generate adjusted break cue data packets by adjusting time stamps from the break cue data packets and to output the adjusted break cue data packets to a break data server. The DPI processor includes a packet merger configured to receive the break cue data packets and the adjusted data packets, to merge the break cue data packets and the adjusted break cue data packets into a data stream, and to output the data stream for insertion into the provider stream.

In one embodiment, a method includes receiving a provider stream including break cue data packets having time stamps corresponding to breaks in a media program in the provider stream. The method includes generating adjusted break cue data packets by adjusting time stamps of the break cue data packets. The method includes merging the break cue data packets and the adjusted break cue data packets into a data stream. The method includes generating an adjusted provider stream by inserting the data stream into the provider stream. The method includes transmitting the adjusted provider stream from a satellite transponder.

In one embodiment, a method includes receiving break cue data packets including SCTE-35 cue tones. The method includes generating adjusted break cue data packets by adjusting the SCTE-35 cue tones in accordance with an offset value, wherein the break cue data packets and the adjusted break cue data packets have a same packet identification. The method includes inserting the adjusted break cue data packets into a television provider transport stream. The method includes transmitting the television provider transport stream including the break cue data packets and the adjusted break cue packets.

DETAILED DESCRIPTION

Figure 1:
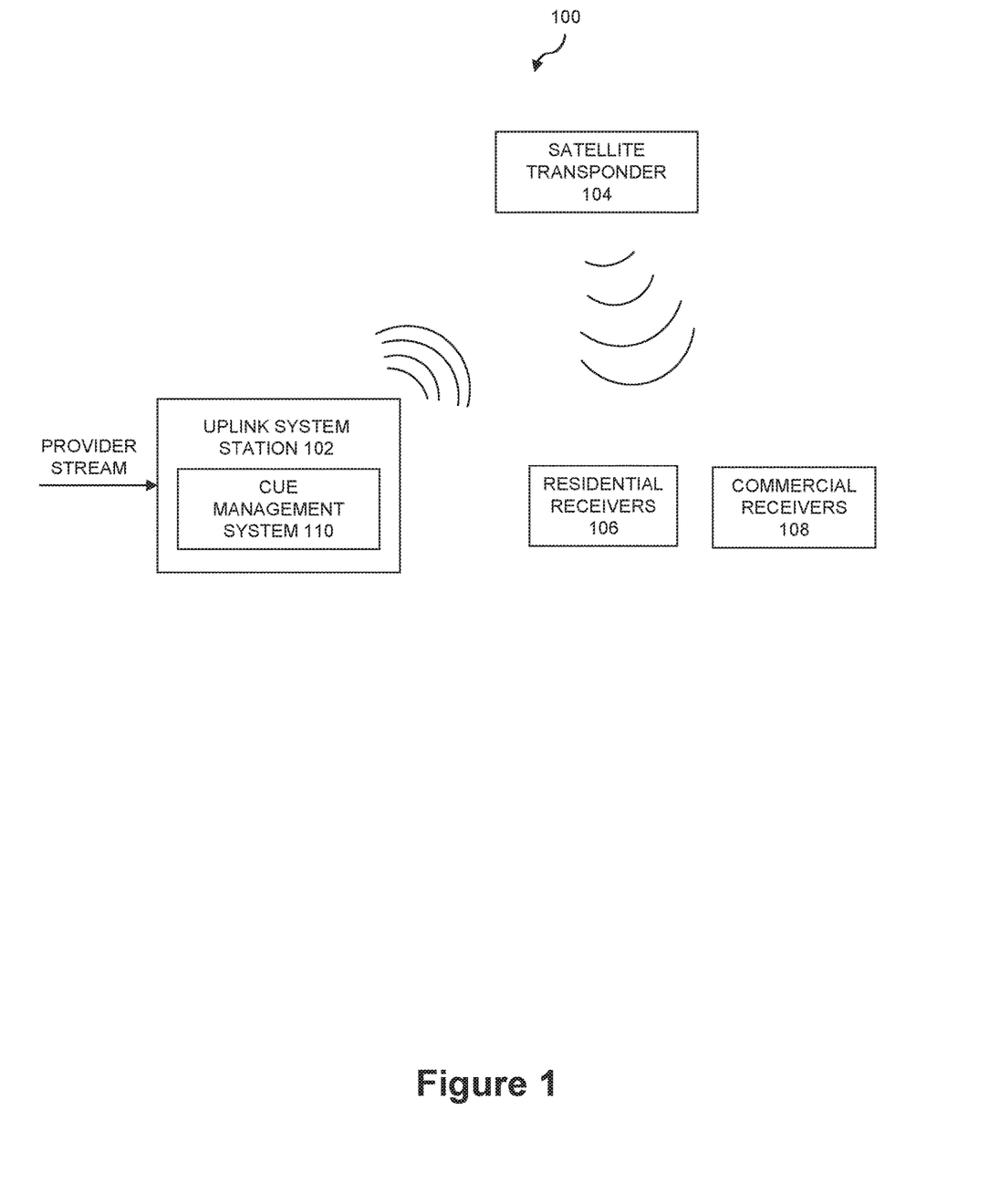
FIG. 1 is a block diagram of a satellite communication system, according to one embodiment.

FIG. 1 is a block diagram of a satellite communication system 100, according to one embodiment. The satellite communication system 100 includes an uplink system 102, one or more satellite transponders 104, residential receivers 106, and commercial receivers 108. The components of the satellite communication system 100 cooperate together to provide satellite communication services.

In one embodiment, the satellite communication system 100 is a satellite television system. The satellite television system provides satellite television services to customers of the satellite television system. Users may subscribe to the satellite television system in order to receive satellite television services from the satellite television system.

The satellite communication system 100 broadcasts a plurality of provider channels to users of the satellite communication system 100. In the example in which the satellite communication system 100 is a satellite television system, the provider channels correspond to television channels. The users can watch any of the available provider channels.

The satellite communication system 100 receives a plurality of provider streams from various content providers. Each provider stream corresponds to a provider channel. Each provider stream includes audio/video (A/V) data. The A/V data corresponds to the audio and video media content that will be consumed by users. As will be described in more detail below, the provider streams also include metadata.

The uplink system 102 of the satellite communication system 100 receives the provider streams. The uplink system 102 may encode, format, or otherwise process the provider streams. The uplink system 102 then provides the provider streams to the one or more satellite transponders 104. Accordingly, the uplink system 102 receives the provider streams, encodes, processes, or formats the provider streams, and transmits them to the one or more satellite transponders 104.

The satellite transponders 104 receive the provider streams from the uplink system 102. The satellite transponders 104 then broadcast the provider streams or provider channels over a large geographic area. In particular, the satellite transponders 104 broadcast the provider streams or provider channels to the users of the satellite communication system that have the appropriate communication equipment. The users can then view or otherwise consume the content of the provider streams or provider channels.

In one embodiment, the satellite communication system 100 includes commercial users and residential users. In general, resident to users correspond to individual users, families, or groups that receive satellite communication services at their place of residence. In general, commercial users correspond to businesses or other organizations that receive satellite communication services in conjunction with a business operation or other type of organizational operation.

Residential users receive satellite communication services via residential receivers 106. The residential receivers 106 can include set-top boxes or other similar types of communication devices communicatively coupled to a satellite antenna, such as a satellite dish, or other type of satellite receiver installed at a residential location. The satellite antenna receives the provider streams from the satellite transponder 104 and provides the provider streams to the residential receiver 106. Users can then view or otherwise consume media content in the provider streams via televisions, monitors, smart phones, projectors, speakers, or other types of equipment that can output audio and/or video media.

Commercial users receive satellite communication services via commercial receivers 108. The commercial receivers 106 can include set-top boxes or other types of communication devices communicatively coupled to a satellite antenna, such as a satellite dish, or other type of satellite receiver installed at a commercial or organizational location. The satellite antenna receives the provider streams from the satellite transponder 104 and provides the provider streams to the commercial receiver 108. Users at the commercial or organizational location can then view or otherwise consume media content in the provider streams via televisions, monitors, projectors, speakers, smart phones, or other types of equipment that can output audio and/or video media.

Promotional offerings are one basis on which distinctions are made between residential users and commercial users. Media programs on a provider channel typically include or provide opportunities for promotional offerings, such as advertisements. Some of the promotional offerings may be carried directly in the provider stream provided to the uplink system 102. In these cases, all users viewing or listening to a program on the provider stream will receive the promotional offering carried directly in the provider stream. In other cases, breaks in a program in a provider stream may be designated for localized or personalized promotional offerings for users in a particular region or for particular types of users. The satellite communication system 100 may make distinctions between residential and commercial users when it comes to promotional offerings.

In one example, an airline provider wishes to provide satellite television services to airline passengers. The airline subscribes to the satellite communication system as a commercial user. Airplanes are then equipped with satellite antennas and one or more commercial receivers 108 in order to receive provider streams from the satellite transponders 104 and to enable the passengers on the airplanes to view the content of the provider streams via screens. In this case it may not make sense that the same promotional offerings should be provided to passengers in an airplane as would be provided to residential users. For example, it may be less effective to provide local advertisements for a particular region to passengers on an airplane. These issues may be applicable in many types of commercial settings. Accordingly, the satellite communication system 100 may make distinctions between residential and commercial users for the purpose of promotional offerings, as will be described in more detail below.

Returning to the provider streams provided to the uplink system 102, each provider stream includes metadata in addition to the A/V data. The metadata includes data related to various aspects of the provider stream. For example, the metadata may include data indicating a name of the provider stream, a name of a current program carried in the provider stream, data related to start and end times of the program, or other types of data. Accordingly, the provider stream includes, in addition to the A/V data, metadata related to the A/V data.

In one embodiment, the metadata for a provider stream includes break cue data. The break cue data includes data related to upcoming breaks in the program for promotional offerings, such as advertisements. The break cue data includes presentation time stamps (PTS) indicating the point in the A/V stream that a promotional offering break will begin. The break cue data can refer to a particular time or to a particular frame in the A/V data at which a promotional offering break will begin. The break cue data can also indicate a particular time or a particular frame in the A/V data at which the promotional offering break will end.

In one embodiment, the provider stream includes SCTE-35 data. The break cue data is SCTE-35 cue tone data. SCTE-35 is a standard established in accordance with the Society of Cable and Telecommunications Engineers (SCTE) that describes the in-line insertion of cue tones in MPEG transport streams. The SCTE-35 cue tones may signal a local ad insertion opportunity in the transport streams. The SCTE-35 cue tones can signal insertion points for other types of events in the transport streams. Accordingly, in one embodiment, the break cue data is SCTE-35 cue tone data.

In some cases, the break cue data included in a provider stream may be slightly erroneous. This means that the SCTE-35 cue tone time stamps are erroneous. Typically, the break cue data points to an A/V frame immediately after a break in programming begins. If the break cue data points to the correct A/V frame, then a promotional offering can be inserted at the correct frame immediately after the break in programming begins. If the break cue data erroneously points to an A/V frame prior to a break in the program, then an inserted promotional offering may begin before the actual break in the program. If the brakes cue data erroneously points to an A/V frame several seconds after the actual break in programming begins, then an inserted promotional offering may continue past the end of the break. The results of both of these types of errors in break cue data is that a portion of an inserted promotional offering plays during the program rather than entirely during the break in the program.

In one embodiment, the uplink system 102 includes a cue management system 110 to assist in ensuring that the brake cue metadata in the provider streams points to the correct A/V frames for inserting a promotional offering. If the break cue data in a provider stream is erroneous, the cue management system 110 can correct the error and can adjust the break cue data to point to the correct A/V frames.

In one embodiment, the cue management system 110 tests the cue breaks in in a provider stream. The cue management system 110 detects whether there is an erroneous offset present in the break cue data. The erroneous offset can correspond to the break cue data pointing to frames before the break in a program or frames too far after the break in a program. When an erroneous offset is detected in the break cue data, the cue management system 110 can adjust the break cue data for that provider stream going forward. In this way, the cue management system 110 adjusts the break cue data to point to the correct frames in the A/V stream.

In one embodiment, the cue management system 110 generates adjusted break cue data. The adjusted break cue data corrects an erroneous offset in the break cue data for a given provider stream. The cue management system 110 inserts the adjusted break cue data into the provider stream.

In one embodiment, the cue management system 110 includes a break data server (BDS). The BDS inserts break description data into the provider stream. The break description data describes the break in programming or describes what type of promotional offering should be inserted during the break in programming. The BDS inserts the break description data as metadata into the provider stream.

In one embodiment, the BDS inserts break description data particularly for residential receivers 106. When the residential receivers 106 receive the provider stream and the break cue data indicates that upcoming breaks, the residential receivers 106 also receive the break description data indicating what type of promotional offering should be inserted at the break. The break description data can indicate that the residential receiver 106 should insert a particular local advertisement, a particular type of local advertisement, or that the residential receiver 106 may choose any proposal offering to insert into the program at the upcoming break.

In one embodiment, the cue management system 110 inserts the original break cue data, the adjusted break cue data, and the break description data into the provider stream. The adjusted break cue data and the break description data are intended for the residential receivers 106. The unaltered or original break cue data is intended for the commercial receivers 108.

In one embodiment, the cue management system 110 includes a DPI processor and a BDS. The DPI processor receives the break cue data and generates adjusted break cue data. The DPI processor passes the break cue data to the BDS. The BDS provides the adjusted break cue data as well as break description data back to the DPI processor. The DPI processor merges the unaltered break cue data, the adjusted break cue data, and the break description data and re-inserts each of these data into the provider stream.

In one embodiment, the merge process of the DPI processor inserts a common packet identification (PID) for unaltered break cue packets, adjusted break cue packets, and break description data packets. The DPI processor writes a first table identification to the unaltered break cue packets. The DPI processor writes a second table identification to the adjusted break cue packets and a third table identification to the break description data packets. The commercial receivers 108 ignore data packets including the second and third table identifications. The residential receivers ignore data packets including the first table identification. Thus, the commercial receivers 108 do not read packets corresponding to the adjusted break cue data and the break description data. The residential receivers 106 do not read packets corresponding to the unaltered break cue data.

Figure 2:
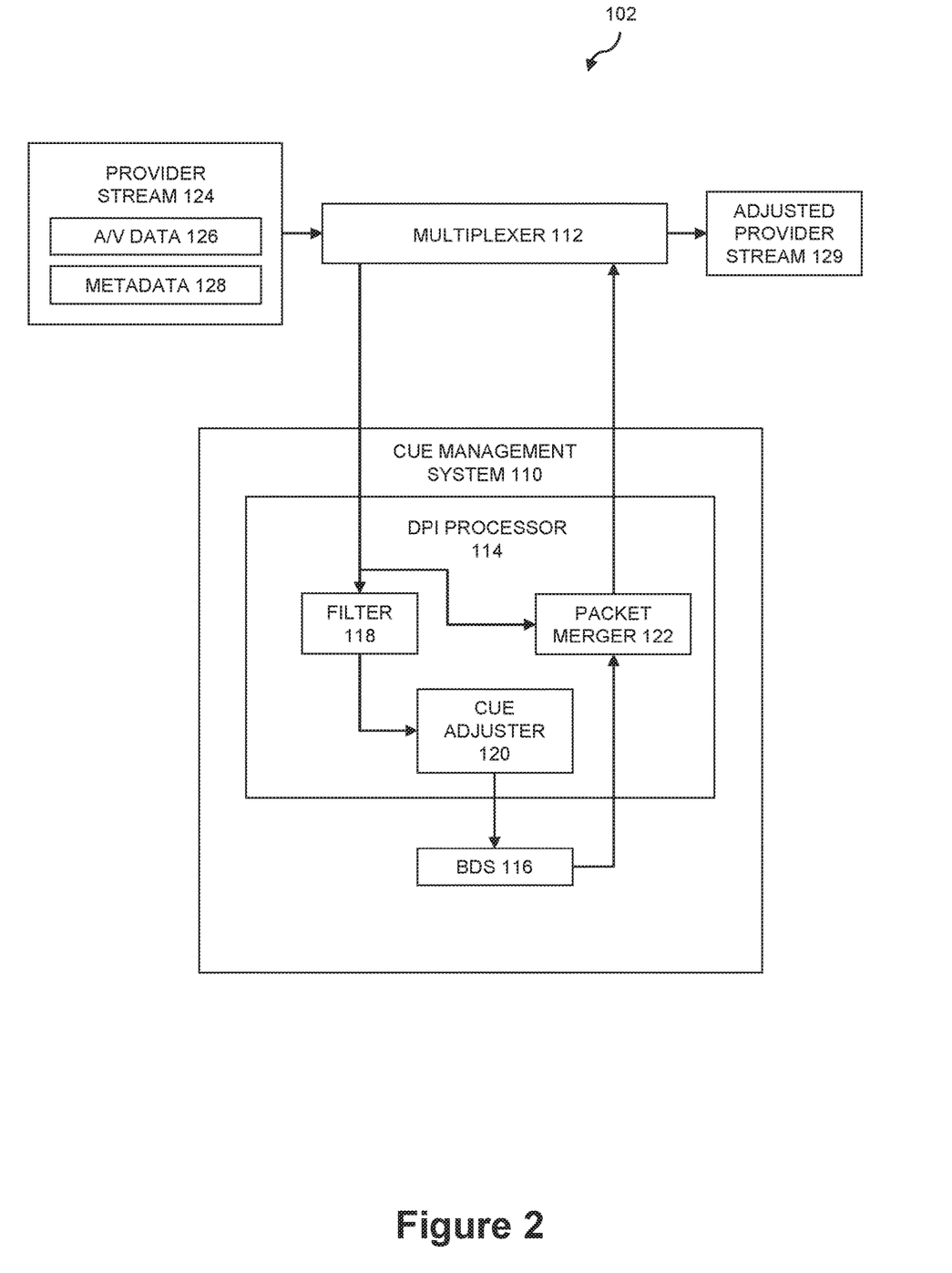
FIG. 2 is a block diagram of satellite uplink system, according to one embodiment.

FIG. 2 is a block diagram of an uplink system 102 of a satellite communication system 100, according to one embodiment. The uplink system 102 includes a cue management system 110 and a multiplexer 112. The components of the uplink system 102 cooperate to transmit, to one or more satellite transponders 104, a provider stream including adjusted break cue data for residential users and unaltered break cue data for commercial users of the satellite communication system 100.

The multiplexer 112 receives a provider stream 124. In an example in which the satellite communication system is a satellite television system, the provider stream corresponds to an A/V stream of a provider television channel. For example, the provider stream 124 may be a program stream of a dedicated sports channel, a movie channel, a news channel, or other types of television channels. While the example of FIG. 2 illustrates a single provider stream, in practice, the uplink system 112 receives a plurality of provider streams.

The provider stream 124 includes (A/V) data 126. The A/V data 126 corresponds to the audio and video media content that will be consumed by users of the satellite communication system 100. The A/V data 126 is in the form of data packets. In one example, each A/V data packet is 188 bytes. The stream of A/V data packets corresponds to a plurality of video frames and corresponding audio, in one embodiment.

The provider stream 124 also includes metadata 128. The metadata can include SCTE-35 data. The SCTE-35 data can include break cue data including time stamps upcoming breaks in the program for promotional offerings, such as advertisements. The break cue data indicates the point in the A/V stream that a promotional offering break will begin. As described previously, in one embodiment, the break cue data is SCTE-35 cue tone data.

In one embodiment, the provider stream 124 is an MPEG-2 transport stream including a plurality of data packets. The transport stream has a PID for video packets, a PID for audio packets, and a PID for DPI packets such as break cue data.

In one embodiment, the provider stream 124 of FIG. 2 comes from an encoder of the satellite communication system 102. Accordingly, the provider stream 124 may have been received, from the provider, by an encoder of the satellite communication system 100. The encoder then passes the provider stream 124 to the multiplexer 112 of FIG. 2.

In one embodiment, the multiplexer 112 is a transport stream multiplexer. The transport stream multiplexer can do statistical multiplexing of multiple provider streams. Accordingly, the multiplexer 112 can receive multiple provider streams. As will be described in more detail below, the multiplexer 112 outputs adjusted provider streams corresponding to adjusted versions of the provider streams 124, adjusted by the cue management system 110.

In one embodiment, the multiplexer 112, or equipment upstream from the multiplexer 112, receives the provider stream 110 and filters out the SCTE-35 data. The SCTE-35 data, including break cue data, is passed to the cue management system 110. The cue management system 110 can adjust the break cue data, as will be described in more detail below.

The break cue system 110 includes a DPI processor 114 and a BDS 116. In one embodiment, the DPI processor includes a filter 118, a cue adjuster 120, and a packet merger 122. The DPI processor 114 and the BDS 116 cooperate together to generate adjusted break cue data, to generate break description data, and to combine the adjusted break cue data and break description data with unadjusted break cue data.

The break cue data and other types of metadata are passed from the provider stream 124 to the filter 118 and the packet merger 122. The filter 118 filters out everything from the SCTE-35 data except the break cue data indicating timestamps for upcoming breaks in the programming associated with the provider stream 124. The filter 118 passes the break cue data to the cue adjuster 120.

In one embodiment, the cue adjuster 120 also receives break cue offset data. The break cue offset data can be received from a cue offset detection system (not shown). The cue offset detection system monitors provider streams to determine if the break cue data associated with the provider stream has an erroneous offset. The erroneous offset corresponds to timestamps of the break cue data being too early or too late. The cue offset detection system measures the value of the erroneous offset and provides the offset value to the cue adjuster 120.

In one embodiment, the cue adjuster 120 receives the break cue data from the filter 118 and the break cue offset data from the cue offset detection system. The cue adjuster 120 generates adjusted break cue data. The adjusted break cue data corresponds to the break cue data 124 with the timestamps adjusted in accordance with the offset data. Accordingly, the adjusted break cue data includes timestamps that correctly match up with breaks in the programming of the provider stream.

In one example, the cue offset detection system determines that a provider stream has break cue data including timestamps are too soon by 1.5 seconds (or by a certain number of frames). The cue offset detection system provides the erroneous offset value of 1.5 seconds (or number of frames) to the cue adjuster 120. When the filter 118 provides the break cue data to the cue adjuster 120, the cue adjuster 120 generates adjusted break cue data. The adjusted break cue data corresponds to the break cue data but with timestamps that have been adjusted by the offset value of 1.5 seconds (or the corresponding number of frames) so that the adjusted timestamps correctly line up with breaks in the program of the provider stream.

In one embodiment, the BDS 116 receives the adjusted break cue data from the cue adjuster 120. The BDS 116 reads the adjusted break cue data and provides break description data for each upcoming break in programming. The break description data describes the type of the upcoming break and provides indications of promotional messages that should play during the upcoming break. The break description data may specify a particular promotional message to be played during the break. The break description data may specify that any promotional message may be selected to be played during the break. The break description data may specify that promotional messages of a particular type should be played during the break.

In one embodiment, the BDS 116 outputs break data description packets and adjusted break cue packets. The break data description packets include the description related to an upcoming break, as well as instructions regarding promotional messages that should be played during the break. The adjusted break cue data packets include adjusted break cue data with adjusted timestamps as generated by the cue adjuster 120. The BDS 116 provides the break data description packets and the adjusted break cue packets to the merge process of the DPI processor 114.

In one embodiment, the merge process 124 merges the unaltered break cue data, the adjusted break cue data, and the break description data into a single data stream. In particular, the merge process 124 ensures that the break cue data packets, the adjusted break cue data packets, and the break description data packets all have a same PID. This may mean that the packet merger 122 adjusts the PIDs of one or more of the types of data packets. This may mean that the packet merger 122 generates copies of each of the data packets except with an adjusted PID.

In one embodiment, the packet merger 122 writes a first table ID to the break cue data packets. The first table ID is selected to signify to commercial receivers 108 that the break cue data packets should be read by the commercial receivers 108. The packet merger 122 writes a second table ID to the adjusted break cue data packets and a third table ID to the break description data packets. The second table ID and the third table ID are selected to signify to residential receivers 106 that the adjusted break cue data packets and the break description data packets should be read by the residential receivers 108. The residential receivers 106 ignore data packets with the first table ID. The commercial receivers 108 ignore data packets with the second table ID and the third table ID.

In one embodiment, the packet merger 122 outputs the break cue data packets, the adjusted break cue data packets, and the break description data packets to the multiplexer 112. The multiplexer 112 joins the break cue data packets, the adjusted break cue data packets, and the break description data packets into the provider stream from which the break cue data packets were initially taken. The multiplexer 112 then outputs an adjusted provider stream 129 to be transmitted to the transponders 104. The adjusted provider stream 129 includes the adjusted break cue data packets, the break description data packets, and the unaltered break cue data packets.

The transponders 104 broadcast the adjusted provider stream to the residential receivers 106 and the commercial receivers 108. The residential receivers 106 read the adjusted break cue data packets and the break description data packets. The residential receivers 106 insert promotional messages at locations in the A/V data corresponding to the timestamps of the adjusted break cue data. The residential receivers 106 select the promotional messages for insertion based on the break description data. The commercial receivers 108 ignore the adjusted break cue data packets and the break description data packets.

In one embodiment, the residential receivers 106 store a plurality of promotional messages. The residential receivers 106 can insert one of the stored promotional messages into an A/V stream in accordance with instructions in the break description data packets. The residential receivers 106 insert promotional messages into the A/V streams that locations in accordance with the timestamps of the adjusted break cue data.

Figure 3:
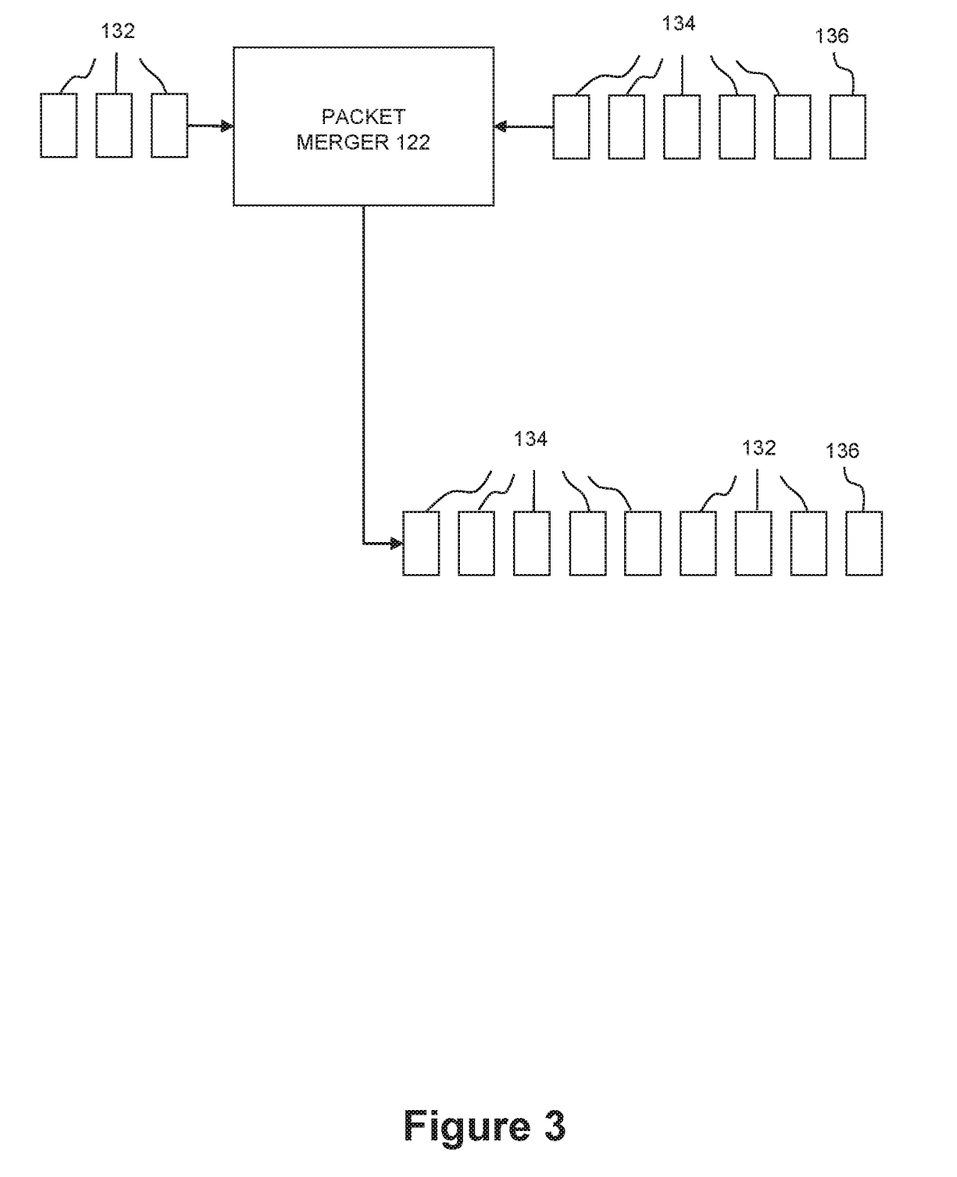
FIG. 3 is an illustration of a packet merging process of a satellite uplink system, according to one embodiment.

FIG. 3 illustrates a packet merging process of a packet merger 122 of a DPI processor 114, according to one embodiment. The packet merger 122 of the DPI processor 114 receives break cue data packets 132. The break cue data packets 132 correspond to original or unaltered break cue data packets with unaltered timestamps. The break cue data packets 132 are received by the packet manager 122 and the filter 118.

The packet merger 122 also receives break description data packets 134 from the BDS 116. The break description data packets 134 include data describing the nature of an upcoming break in programming. The break description data packets 134 also include indications of promotional messages that should be inserted into an A/V stream during the break.

The packet merger 122 also receives adjusted break cue data packets 136 from the BDS. The adjusted break cue data packets 136 include adjusted timestamps. The timestamps have been adjusted in accordance with an error offset detected by an offset detection system.

The packet merger 122 merges the data packets 132, 134, and 136 into a single data stream. The packet merger 122 also ensures that the data packets 132, 134, and 136 have a same PID. The packet merger 122 also ensures that the data packets 132 have a first table ID, that the data packets 134, have a second table ID, and that the data packets 136 have a third table ID. The stream of packets is joined back into the provider stream 124.

Figure 4:
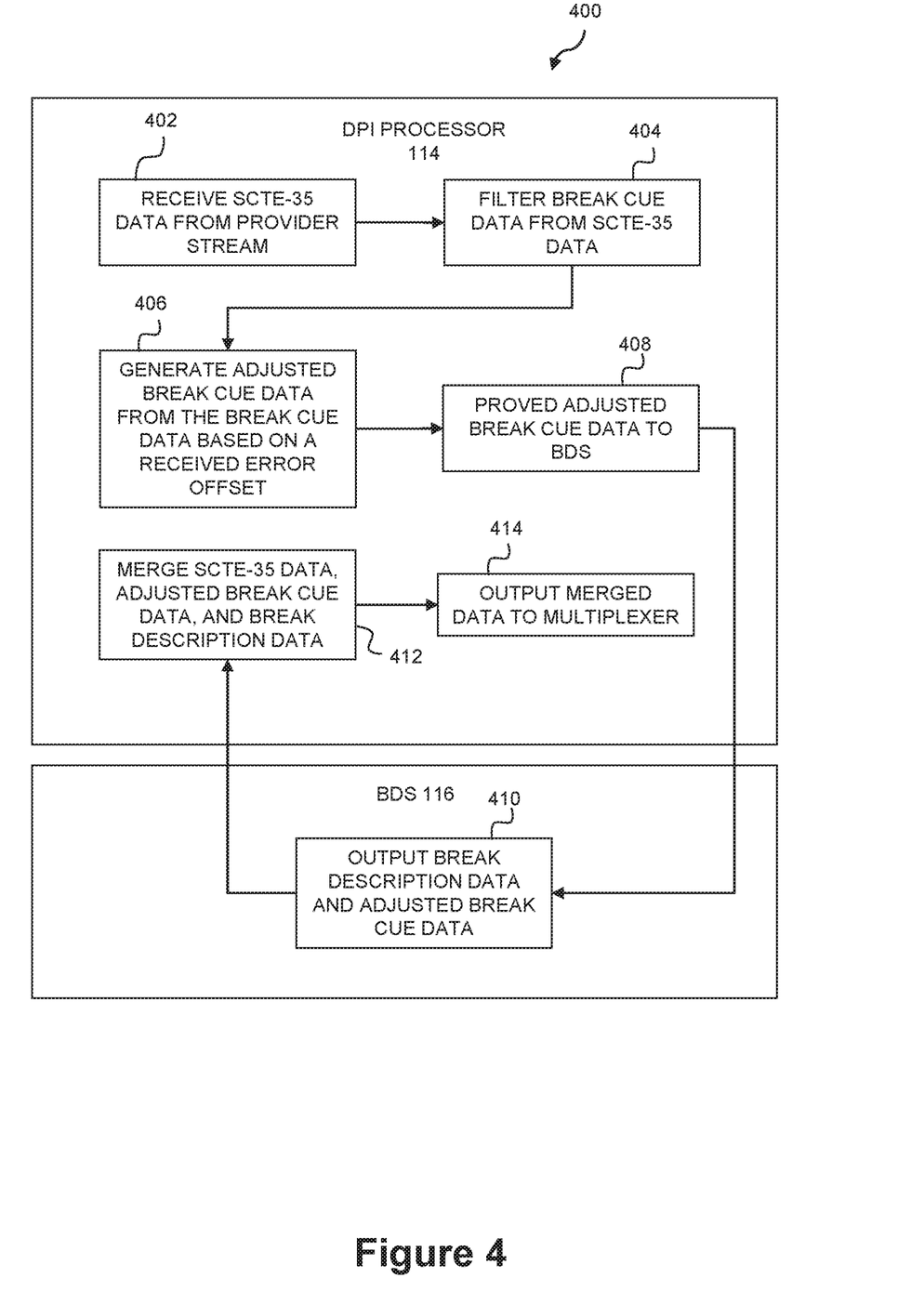
FIG. 4 is a functional flow diagram of satellite uplink process, according to one embodiment.

FIG. 4 is a functional block diagram of a process 400, according to one embodiment. At block 402, DPI processor receives SCTE-35 data from a provider stream, using any of the systems, procedures, or components described above in relation to FIGS. 1-3. From block 402, the process proceeds to block 404.

At block 404, the DPI processor 114 filters break cue data from the SCTE-35 stream, using any of the systems, procedures, or components described above in relation to FIGS. 1-3. The filtered break cue data is provided to an adjuster of the DPI processor 114. From block 404, the process proceeds to block 406.

At block 406, the DPI processor 114 generates adjusted break cue data based on a received error offset, using any of the systems, procedures, or components described above in relation to FIGS. 1-3. The error offset is received from a cue offset detection system. From block 406, the process proceeds to block 408.

At block 408, the DPI processor 114 provides the adjusted break cue data to the BDS 116, using any of the systems, procedures, or components described above in relation to FIGS. 1-3. From block 408, the process proceeds to block 410.

At block 410, the BDS outputs break description data and the adjusted break cue data to the DPI processor 114, using any of the systems, procedures, or components described above in relation to FIGS. 1-3. From block 410, the process proceeds to block 412.

At block 412, the DPI processor 114 merges the SCTE-35 data with the adjusted break cue data and the break description data, using any of the systems, procedures, or components described above in relation to FIGS. 1-3. The DPI processor 114 ensures that each type of data packet has a same PID. The DPI processor 114 also ensures that unaltered break cue data packets have a first table ID, that adjusted break cue data packets have a second table ID, that break description data packets have a third table ID. From block 412, the process proceeds to block 414.

At block 414, the DPI outputs the merged data packets to a multiplexer, using any of the systems, procedures, or components described above in relation to FIGS. 1-3.

Figure 5:
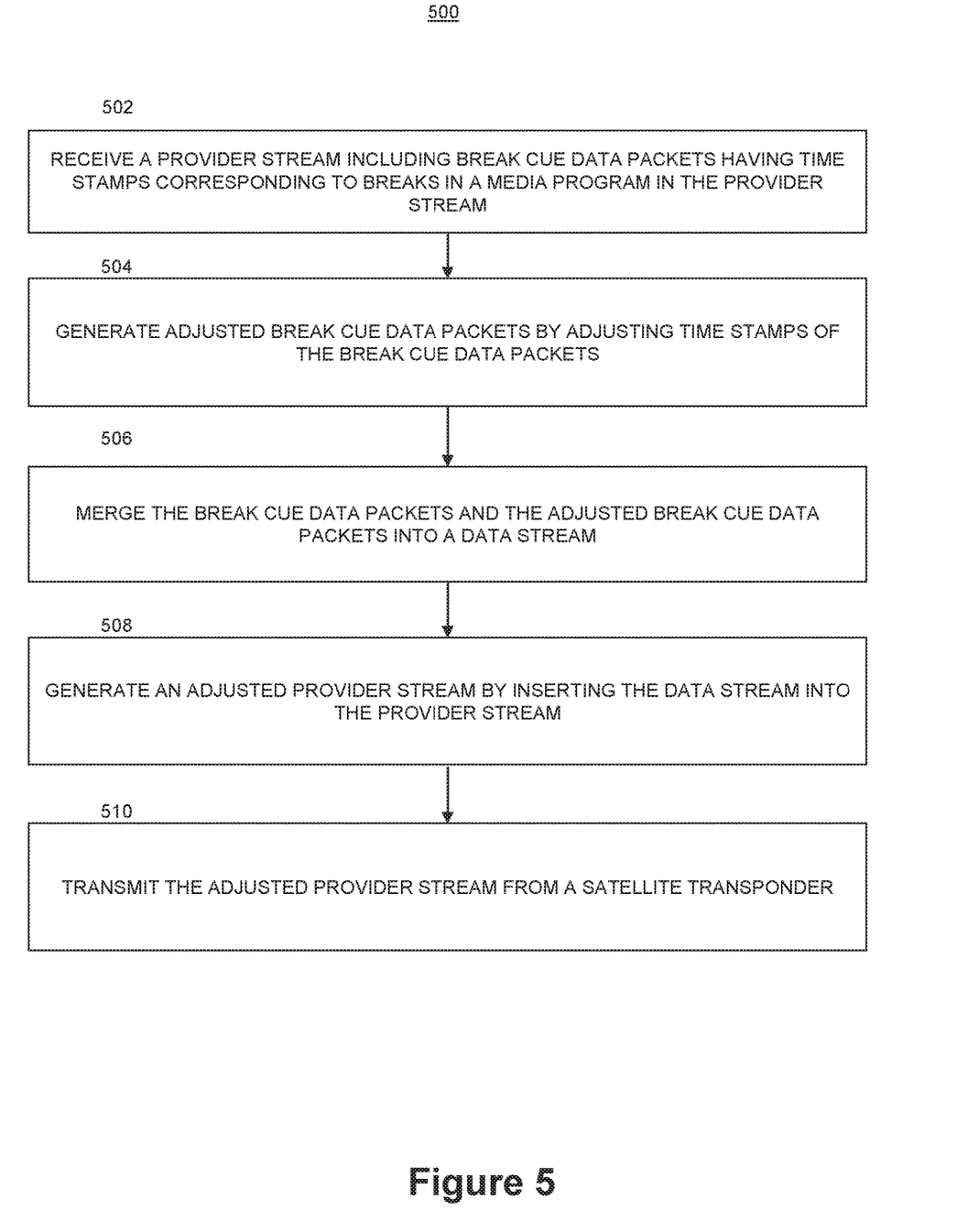
FIG. 5 is a flow diagram of a method, according to one embodiment.

FIG. 5 is a flow diagram of a method 500, according to one embodiment. At 502, the method 500 includes receiving a provider stream including break cue data packets having time stamps corresponding to breaks in a media program in the provider stream. At 504, the method 500 includes generating adjusted break cue data packets by adjusting time stamps of the break cue data packets. At 506, the method 500 includes merging the break cue data packets and the adjusted break cue data packets into a data stream. At 508, the method 500 includes generating an adjusted provider stream by inserting the data stream into the provider stream. At 510, the method 500 includes transmitting the adjusted provider stream from a satellite transponder.

Figure 6:
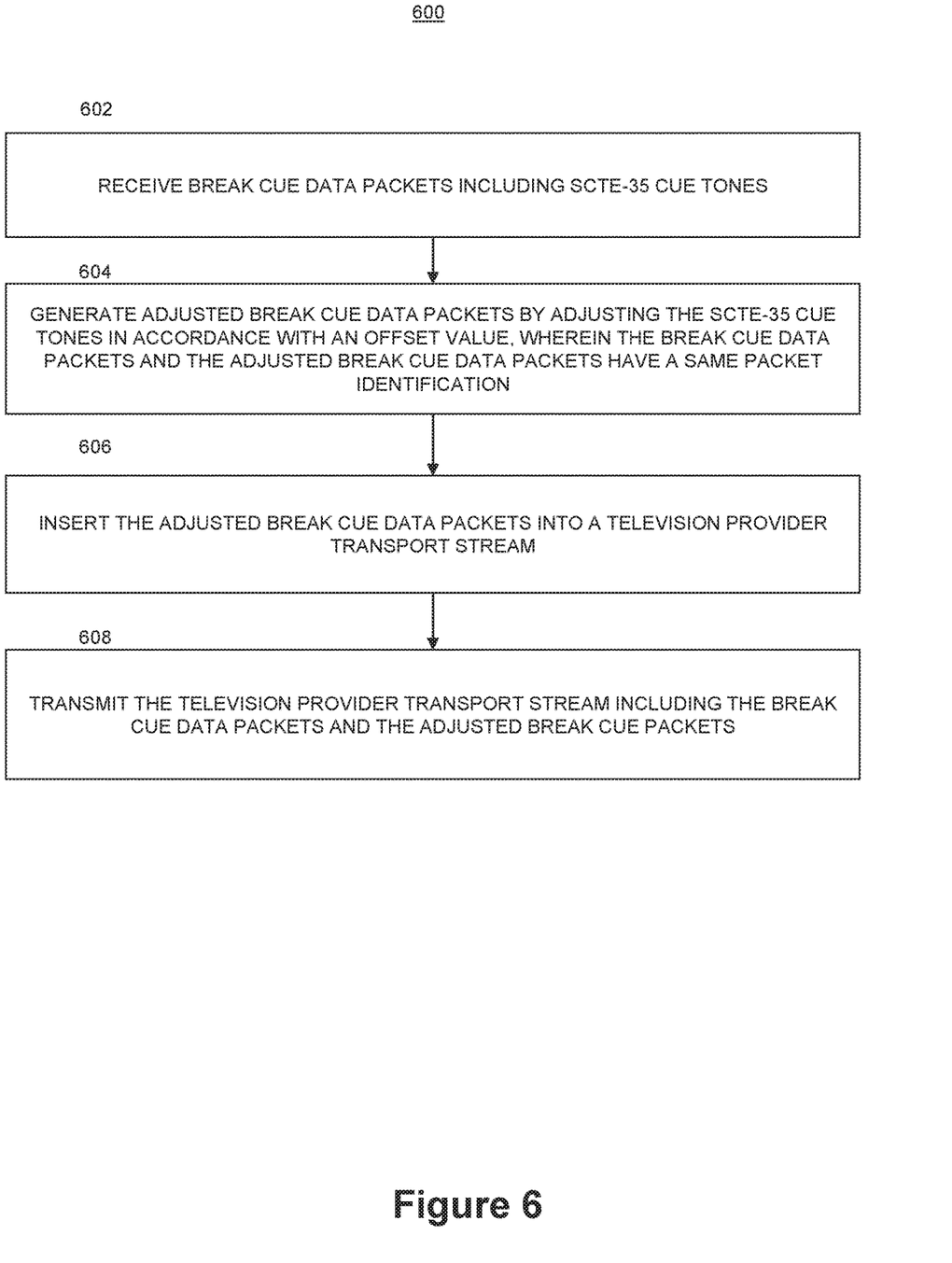
FIG. 6 is a flow diagram of a method, according to one embodiment.

FIG. 6 is a flow diagram of a method 600, according to one embodiment. At 602, the method 600 includes receiving break cue data packets including SCTE-35 cue tones. At 604, the method 600 includes generating adjusted break cue data packets by adjusting the SCTE-35 cue tones in accordance with an offset value, wherein the break cue data packets and the adjusted break cue data packets have a same packet identification. At 606, the method 600 includes inserting the adjusted break cue data packets into a television provider transport stream. At 608, the method 600 includes transmitting the television provider transport stream including the break cue data packets and the adjusted break cue packets.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
receiving a provider stream including break cue data packets having time stamps corresponding to breaks in a media program in the provider stream;
generating adjusted break cue data packets by adjusting time stamps of the break cue data packets;
merging the break cue data packets and the adjusted break cue data packets into a data stream;
merging break description data packets into the data stream, wherein the break description data packets indicate promotional messages to insert at breaks in the media program, wherein the merging the break cue data packets includes ensuring break description data packets, the break cue data packets, and the adjusted break cue data packets have a same packet identification by at least:
adjusting the packet identification of one or more of break description data packets, the break cue data packets, and the adjusted break cue data packets by generating copies of each of the one or more of break description data packets, the break cue data packets, and the adjusted break cue data packets during the merging, except with an adjusted packet identification for the each of the one or more of break description data packets, the break cue data packets, and the adjusted break cue data packets;
generating an adjusted provider stream by inserting the data stream into the provider stream; and
transmitting the adjusted provider stream from a satellite transponder.

2. The method of claim 1, wherein the break cue data packets have a first table identification, the break description data packets have a second table identification, and the adjusted break cue data packets have a third table identification.

3. The method of claim 2, wherein the first table identification is selected to be read by commercial satellite receivers, wherein the second and third table identifications are selected to be read by residential satellite receivers.

4. The method of claim 1, wherein the break cue data packets include SCTE-35 cue tones.

5. The method of claim 1, further comprising receiving an offset value corresponding to an error in the time stamps of the break cue data packets, wherein adjusting time stamps from the break cue data packets includes adjusting the time stamps based on the offset value.

6. A method, comprising:
receiving break cue data packets including SCTE-35 cue tones;
generating adjusted break cue data packets by adjusting the SCTE-35 cue tones in accordance with an offset value, wherein the break cue data packets and the adjusted break cue data packets have a same packet identification;
generating a first table identification to identify unaltered break due cue data packets for commercial satellite receivers;
selecting the first table identification to signify to commercial receivers that the break cue data packets should be read by the commercial receivers;
generating a second table identification to identify break description data packets for residential satellite receivers;
selecting the second table identification to signify to residential receivers that the adjusted break cue data packets should be read by the residential receivers;

generating a third table identification to identify the adjusted break cue data packets for residential satellite receivers, selecting the third table identification to signify to residential receivers that break description data packets should be read by the residential receivers, wherein the break cue data packets and the adjusted break cue data packets have different table identifications;

generating a data stream by merging the break cue data packets, the adjusted break cue data packets and the break description data packets, wherein the merging includes:

a packet merger writing the first table identification to the break cue data packets;

the packet merger writing the second table identification to the adjusted break cue data packets; and the packet merger writing the third table identification to the break description data packets, wherein inserting the adjusted break cue data packets into the television provider transport stream includes inserting the data stream into the television provider transport stream;

inserting the adjusted break cue data packets into a television provider transport stream; and transmitting the television provider transport stream including the break cue data packets and the adjusted break cue packets, the first table identification, the second table identification and third table identification.

7. The method of claim 6, wherein the television provider transport stream is an MPEG transport stream.

8. The method of claim 6, wherein the television provider transport stream includes video data packets and audio data packets.

* * * * *